(12) United States Patent
Nam

(10) Patent No.: US 6,190,712 B1
(45) Date of Patent: Feb. 20, 2001

(54) COLD-STORAGE METHOD OF KIMCHI JAR

(75) Inventor: Seung-Weon Nam, Kwangju (KR)

(73) Assignee: Kwangju Electronics Co., Ltd., Kwangju (KR)

( * ) Notice: Under 35 U.S.C. 154(b), the term of this patent shall be extended for 0 days.

(21) Appl. No.: 09/173,676

(22) Filed: Oct. 16, 1998

(30) Foreign Application Priority Data

Oct. 18, 1997 (KR) .................................................. 97-53624

(51) Int. Cl.[7] .................................................. A23L 3/00
(52) U.S. Cl. .......................................... 426/231; 426/524
(58) Field of Search .................. 426/231, 524; 99/470

(56) References Cited

U.S. PATENT DOCUMENTS 5,456,164 * 10/1995 Bang ........................................ 99/470
5,458,186 * 10/1995 Lee et al. ................................ 99/470

* cited by examiner

Primary Examiner—George C. Yeung
(74) Attorney, Agent, or Firm—Burns, Doane, Swecker & Mathis, L.L.P.

(57) ABSTRACT

A cold-storage method of a kimchi jar whereby kimchi is thawed after selectively input freezing time lapses to thereafter refrigerate same, so that the kimchi is prevented from being naturally aged to enable to enjoy fresh flavor of the kimchi for a long time, the method comprising the steps of: maintaining an in-chamber temperature at an established cold storage temperature for a cold storage period of time established by a manipulating unit to thereby refrigerate the kimchi; and maintaining the in-chamber temperature at a refrigerated storage temperature when the established cold storage period of time lapses, to thaw and thereafter to cold storage the kimchi stored in the cool chamber.

5 Claims, 5 Drawing Sheets

COLD-STORAGE METHOD OF KIMCHI JAR

BACKGROUND OF THE INVENTION

1. Field of the Invention

The present invention relates to a kimchi jar and more particularly to a cold-storage method of kimchi jar by which kimchi in a jar is cold-stored for a predetermined period of time to thereafter be stored in refrigeration.

2. Description of the Prior Art

Generally, a refrigerator having a refrigerating chamber and a freezing chamber is used for storing deep-freezed and refrigerated foodstuffs.

However, in case kimchi is stored in the refrigerating chamber with other foodstuffs, odor generating from fermentation of kimchi makes other foodstuffs reek with fermenting kimchi odor, killing intrinsic flavors of other foodstuffs, which necessitates to store the kimchi in a separate storage.

In the former case, kimchi is stored in a jar buried under the ground for a very long time in the winter time. However it is very difficult and inconvenient nowadays for people living in apartments to bury a jar under the ground due to characteristic of the apartments.

In order to solve the afore-mentioned problems, various studies are being launched these days to keep the kimchi in a separate storage, and FIGS. 1, 2 and 3 show conventional kimchi jars.

As illustrated in FIGS. 1 and 2, a kimchi jar according to the prior art includes a body 10 and a door 20.

The door 20 is disposed at an upper area thereof with a manipulating unit 32 for selectively inputting various courses of the jar, a control panel 30 including a display unit 34, a handle 15 for carriage of the jar, and a door handle 25 for easy opening and closing of the door 20.

Meanwhile, FIG. 3 is a vertical sectional view taken along A–A' of FIG. 1, where the body 10 is arranged therein with a compressor 12 and an evaporator 14 for transmitting the cool air generated in the course of coolant being evaporated into a cool chamber 40, a heater 16, hot wires 18 and a temperature detecting sensor 50.

Now, operational process of the kimchi jar according to the prior art thus constructed will be described in accordance with FIGS. 1, 2, 3 and 4.

First of all, kimchi is put into the cool chamber 40, the door 20 is closed, the kind of kimchi is selected by way of the manipulating unit 32 on the control panel 30 and a desired mode (by way of example, aging mode, refrigerated storage mode, etc) is selected and input.

Next, a control unit (not shown) generates a control signal for selectively driving the compressor 12 and the heater 16 according to the kind of the kimchi and mode to age or store the kimchi in cool state.

In other words, the kimchi is aged by the heat transmitted into the cool chamber 40 via the hot wires 18, where the control unit keeps performing aging for an established aging period (T1 in FIG. 4) by letting an ambient temperature of the hot wire 18 maintain an established aging temperature preferably 25 degrees celsius).

Furthermore, the compressor 12 is activated by the control signal from the control unit during refrigerated storage mode to circulate the coolant, which is in turn evaporated via the evaporator 18, and the cool air generated therefrom is transferred to the cool chamber 40 to coolly store the kimchi. At this time, the control unit serves to discriminate an in-chamber temperature of the cool chamber 40 cooled by the ambient temperature of the evaporator 14 detected by the temperature detecting sensor 50, where the in-chamber temperature thus discriminated is kept as a refrigerated storage temperature (preferably zero degree celsius) to thereby perform the refrigerated storage (T2 in FIG. 4).

SUMMARY OF THE INVENTION

It is an object of the present invention to provide a cold-storage method of kimchi jar by which kimchi is refrigerated in a kimchi jar for a predetermined period of time and is let to be aged for storage to thereby prevent an over-aging due to natural aging.

In accordance with the object of the present invention, there is provided a cold-storage method of kimchi jar for keeping in refrigeration the kimchi in the kimchi jar, the method comprising the steps of:

maintaining an in-chamber temperature at an established cold storage temperature for a cold storage period of time established by a manipulating unit to thereby refrigerate the kimchi; and maintaining the in-chamber temperature at a refrigerated storage temperature when the established cold storage period of time lapses, to thaw and thereafter to cold storage the kimchi stored in the cool chamber.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

The preferred embodiment of the present invention will be described in detail with reference to the accompanying drawings.

Figure 1:
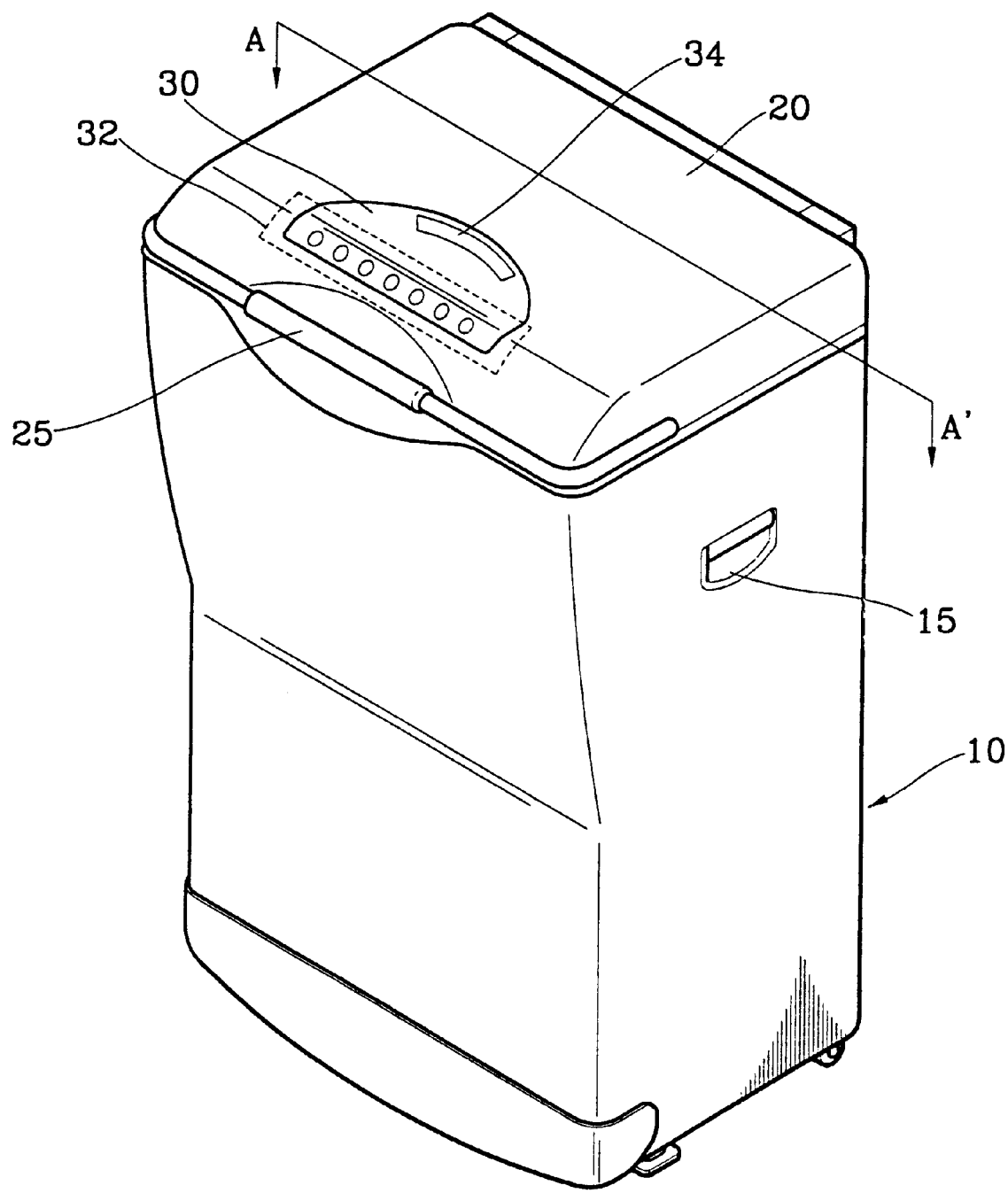
FIGS. 1 and 2 are perspective views of a kimchi jar according to the prior art.
Figure 2:
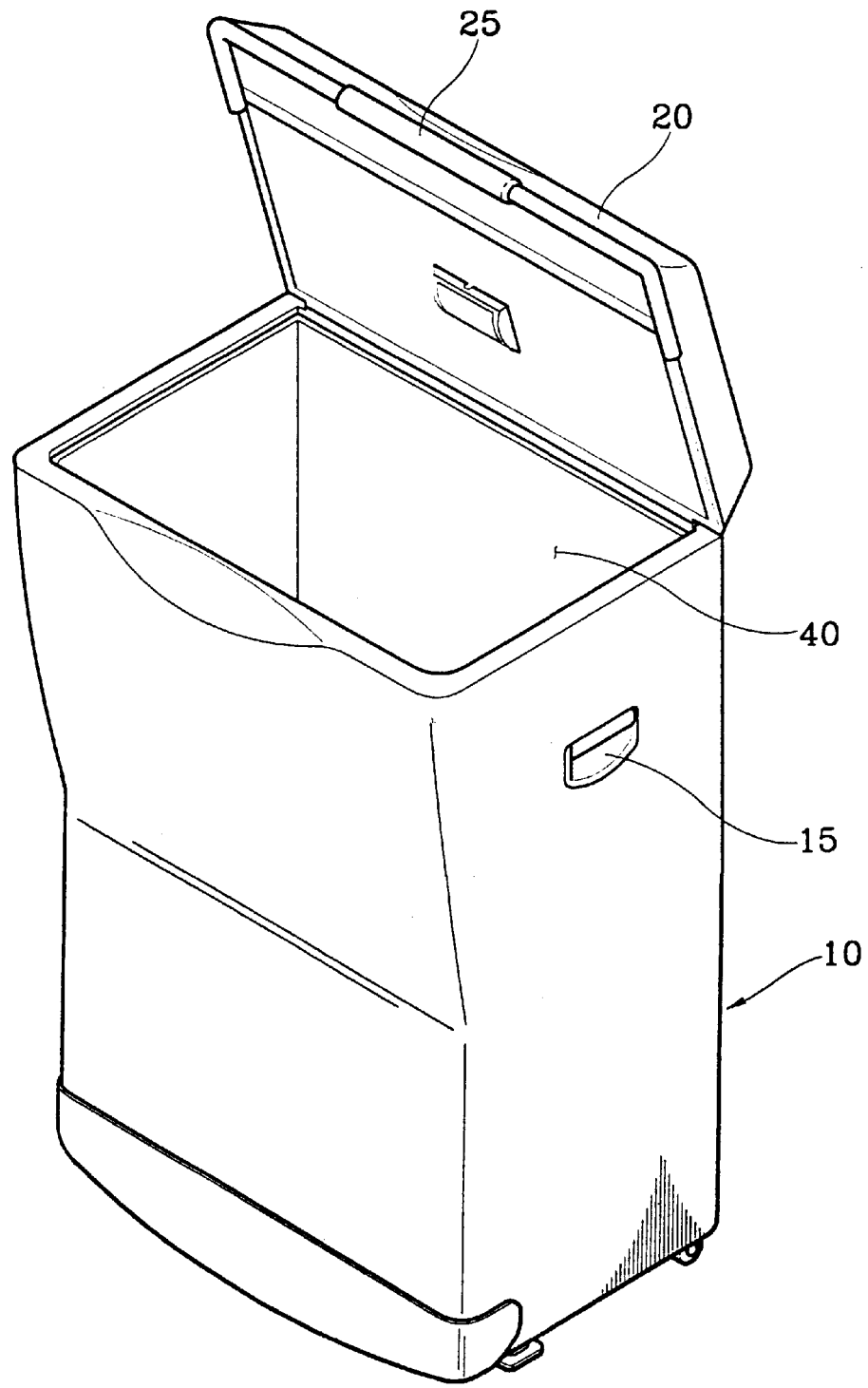
Figure 3:
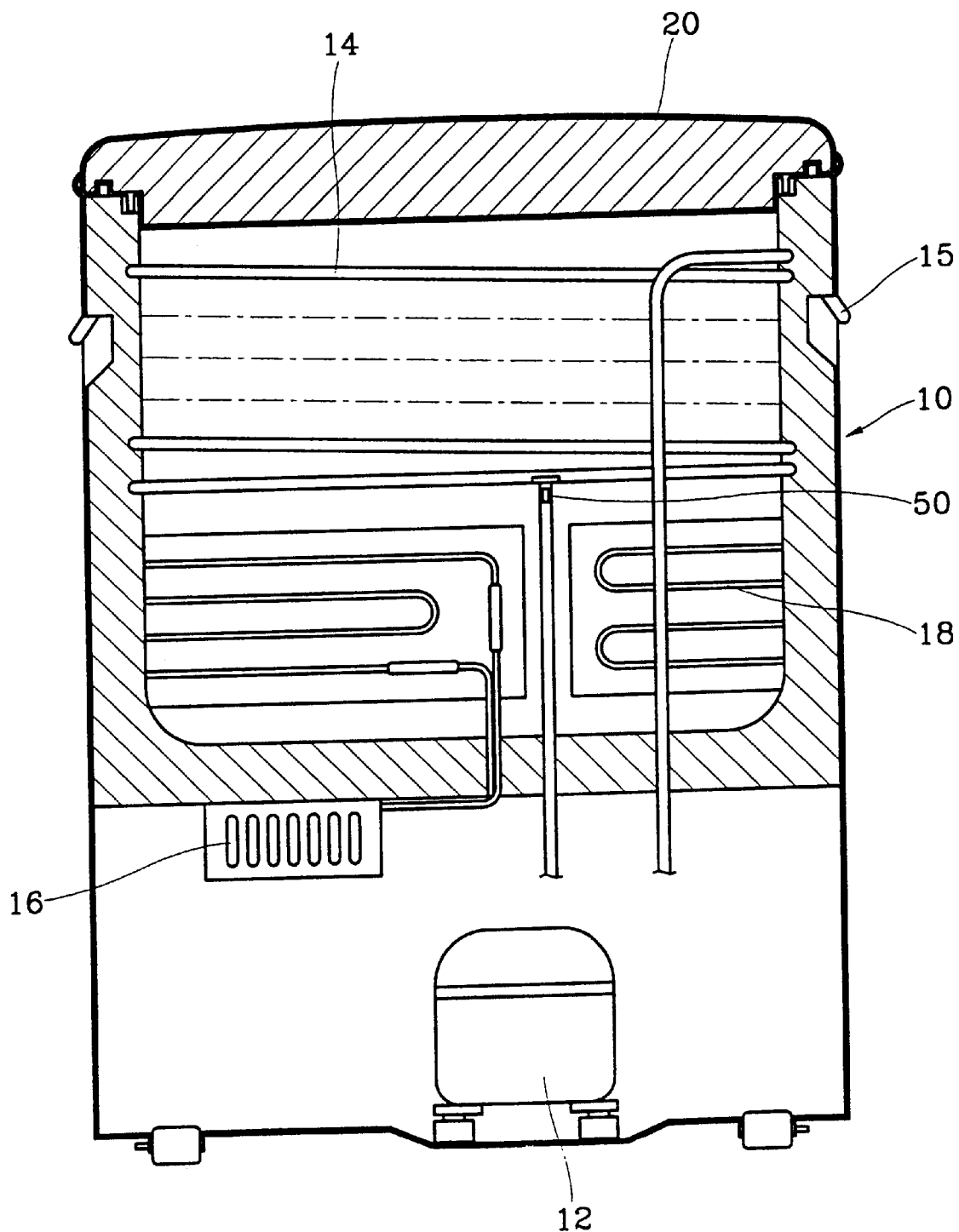
FIG. 3 is a schematic diagram for illustrating an inner structure of a kimchi jar according to the prior art.
Figure 4:
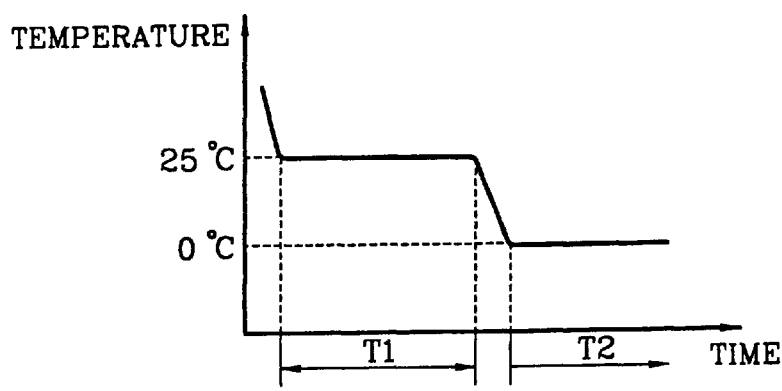
FIG. 4 is a schematic diagram for illustrating an operational process for refrigerating kimchi stored in a kimchi jar according to the prior art.
Figure 5:
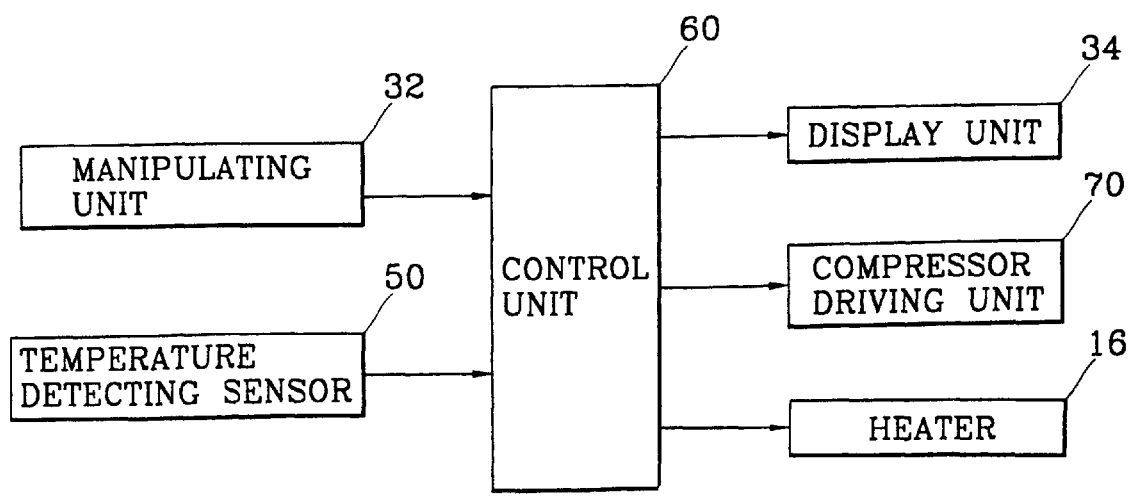
FIG. 5 is a schematic diagram for illustrating a hardware for performing a refrigerated storage method according to the present invention.

FIG. 5 is a schematic block diagram of a hardware for illustrating a cold-storage method of a kimchi jar according to the present invention, where the hardware comprises a manipulating unit 32, a temperature detecting sensor 50, a control unit 60, a display unit 34 and a compressor driving unit 70. The manipulating unit 32 serves to selectively input various courses of the kimchi jar according to manipulation of a user and the temperature detecting sensor 50 is designed to detect an in-chamber temperature of the cool chamber 40 to thereby input same to the control unit 60.

The control unit 60 generates a control signal for selectively driving the compressor and the heater 16 according to various courses selectively input by the manipulating unit 32 and a control signal for displaying a current status of the kimchi jar. The control unit 60 also generates a control signal for storing the kimchi in the cool chamber 40 at an established cold storage temperature (preferably at 10 degrees below zero celsius) when the course selectively input by the manipulating unite 32 is the cold storage course, and for driving the heater 16 to thaw the cold-storaged kimchi and to store same.

Furthermore, the display unit 34 displays the present status of the kimchi jar according to the control signal output from the control unit 60, and the compressor driving unit 70 drives the compressor according to the control signal from the control unit 60 to cooldown the in-chamber temperature of the cool chamber 40. The heater 16 generates heat through the hot wire 18 according to the control signal output from the control unit 60 to increase the in-chamber temperature.

Figure 6:
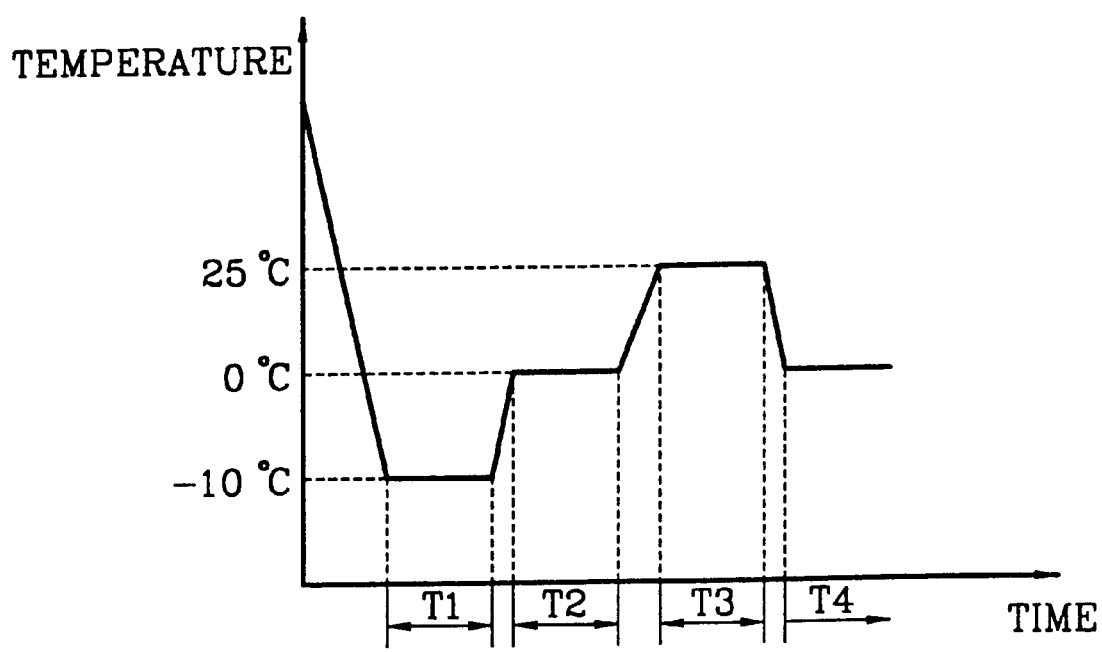
FIG. 6 is a schematic diagram for illustrating an operational process for cold storaging kimchi stored in a kimchi jar according to the preferred embodiment of the present invention.

Now, operational process of cold-storage method of the kimchi jar according to the present invention thus constructed will be described in detail with reference to FIGS. 5 and 6.

First of all, when a user established a period (by way example, one month) during which kimchi is to be cold-storaged via the manipulating unit 32 and manipulates an operation key, the control unit 60 drives the compressor 12 to generate a control signal for cooling the cool chamber 40. The control unit 60 then generates a control signal for periodically driving the compressor 12 in order to cold-storage the kimchi when the in-chamber temperature of the cool chamber 40 reaches the cold-storage temperature (preferably 10 degrees below zero celsius), thereby maintaining the in-chamber temperature of the cool chamber 40 at the cold-storage temperature for the established period (by way of example, one month).

Meanwhile, the control unit 60 drives the heater 16 when the predetermined established period of time (one month) lapses to generate a control signal for thawing the cold-storaged kimchi. The heater 16 is activated by the control signal output from the control unit 60 to increase the in-chamber temperature according to the heat generated from the hot wire 18.

At this time, the control unit 60 generates a control signal for periodically driving the compressor 12 and the heater 16 for refrigerating the kimchi when the in-chamber temperature reaches the refrigerated storage temperature (preferably zero degree celsius), then the compressor 12 and the heater 16 are periodically driven according to the control signal output from the control unit 60 to maintain the in-chamber temperature at the refrigerated storage temperature. (T2 in FIG. 6)

Successively, the control unit 60 generates a control signal for aging the kimchi for an established predetermined period of time in order to completely thaw the kimchi after the predetermined time lapses, and the heater 16 is driven to increase the in-chamber temperature according to the heat generated from the hot wire 18.

At this time, the control unit generates a control signal for periodically driving the compressor 12 and the heater 16 in order to maintain the kimchi at an aging temperature (25 degrees celsius) when the in-chamber temperature detected by the temperature detecting sensor 50 reaches the established aging temperature (preferably 25 degrees celsius).

The heater 16 and the compressor 12 are periodically rendered active by the control signal from the control unit 60 to thereby maintain the cool chamber 40 at the aging temperature and to age the kimchi stored in the cool chamber 40. (T3 in FIG. 6)

Successively, the control unit 60 generates a control signal for refrigerating the kimchi when counted time passes an aging period corresponding to the course selectively input by the manipulating unit 32, and the compressor 12 is driven according to the control signal from the control unit 60 by the compressor driving unit 70 to cool the in-chamber temperature of the cool chamber 40.

At this time, the control unit 60 generates a control signal for periodically driving the compressor 12 and the heater 12 for refrigerating the kimchi when the in-chamber temperature reaches the refrigerated storage temperature (preferably zero degree celsius) detected by the temperature detecting sensor 50, and the compressor 12 and the heater 16 are periodically turned on by the control signal output from the control unit 60, thereby maintaining the cool chamber and the kimchi at the refrigerated storage temperature. (T4 in FIG. 6)

As apparent from the foregoing, there is an advantage in the cold-storage method of a kimchi jar according to the present invention in that kimchi is thawed after selectively input freezing time lapses to thereafter refrigerate same, so that the kimchi is prevented from being naturally aged to enable to enjoy fresh flavor of the kimchi for a long time.

What is claimed is:

1. A method of refrigerating kimchi utilizing a kimchi chamber, a heating/cooling mechanism for regulating a temperature of the chamber, and a controller connected to the heating/cooling mechanism for controlling the temperature of the chamber, the method comprising the steps of:

A. inserting kimchi in a container;

B. placing the container in the chamber;

C. maintaining an in-chamber temperature at a predetermined cold storage freezing temperature for a cold storage period of time to thereby freeze the kimchi;

D. maintaining the in-chamber temperature at a predetermined thawing temperature when the cold storage period of time lapses, to thaw the frozen kimchi stored in the chamber; and E. maintaining the in-chamber temperature at a predetermined refrigerated storage temperature higher than the temperature of step C for storing the thawed kimchi.

2. The method according to claim 1 wherein the in-chamber temperatures of steps D and E are the same.

3. The method according to claim 1 further including, between steps D and E the step of maintaining the in-chamber temperature at a predetermined aging temperature higher than the temperatures of steps D and E, suitable for aging the kimchi.

4. The method according to claim 3 wherein the in-chamber temperatures of steps D and E are the same.

5. The method according to claim 3 wherein the in-chamber temperature of step C is about −10° C., the in-chamber temperature of step D is above 0° C., and the in-chamber temperature of step E is about 0° C.

* * * * *